C. T. RAY.
PLOW.
APPLICATION FILED JAN. 2, 1918.

1,297,909.

Patented Mar. 18, 1919.
3 SHEETS—SHEET 1.

Witness

Inventor
C. T. Ray
By C. J. Strickman
Attorney

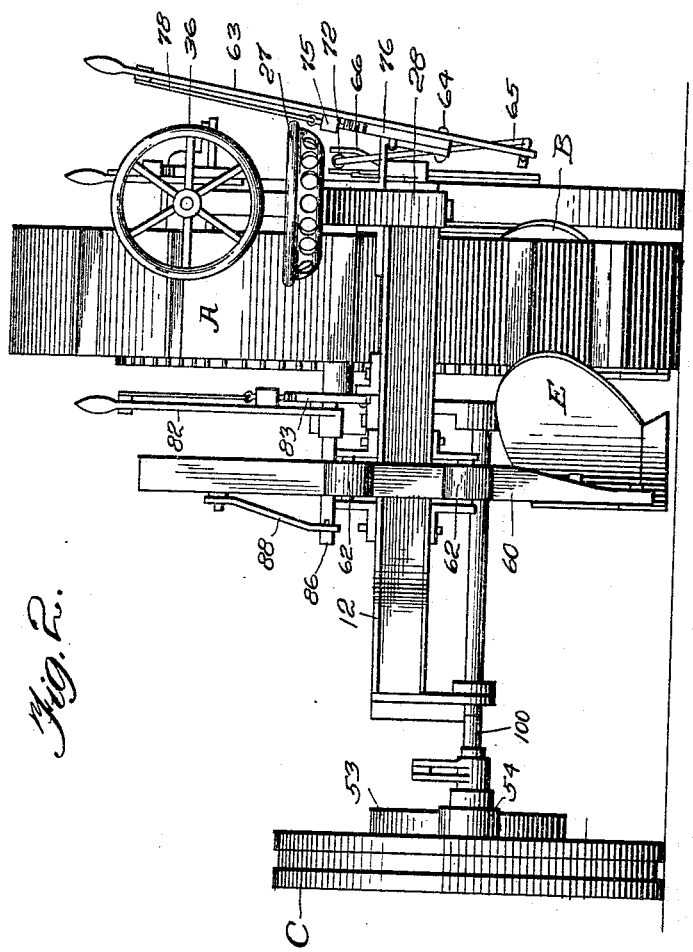

C. T. RAY.
PLOW.
APPLICATION FILED JAN. 2, 1918.
1,297,909.
Patented Mar. 18, 1919.
3 SHEETS—SHEET 3.
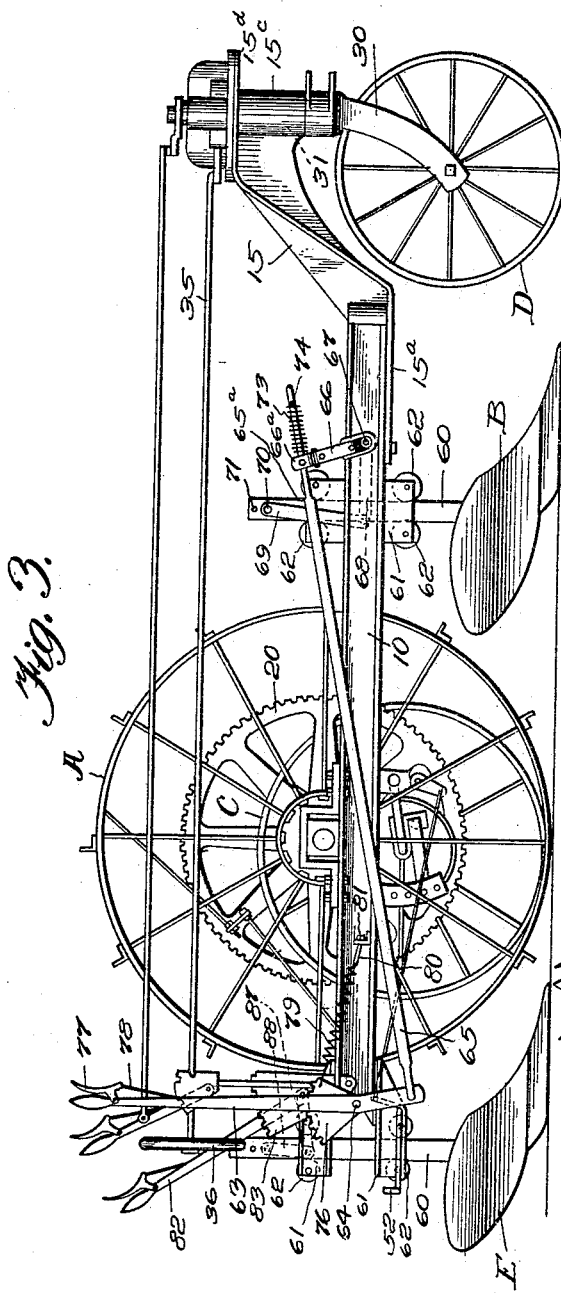
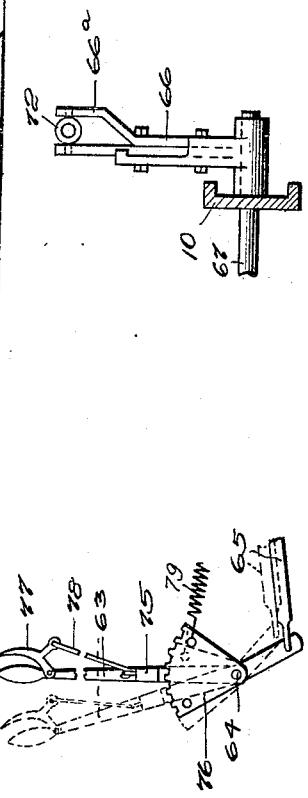

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLOW.

1,297,909.  Specification of Letters Patent.  Patented Mar. 18, 1919.

Original application filed September 3, 1915, Serial No. 48,813. Divided and this application filed January 2, 1918. Serial No. 209,996.

*To all whom it may concern:*

Be it known that I, CHARLES T. RAY, a citizen of the United States, residing at Louisville, in the county of Jefferson and State of Kentucky, have invented certain new and useful Improvements in Plows, of which the following is a specification.

This application is a division of my application for Letters Patent filed September 3, 1915, Serial No. 48,813, for improvements in motor plows. It particularly relates to a plowing implement having yieldably supported furrow turning means and consists in the novel combinations and correlations of elements substantially as hereinafter described and particularly pointed out in the claims.

One of the important purposes of this invention is to provide a plowing implement having a frame and a supporting wheel with a plurality of plowing members respectively arranged forward and rearward of the axis of said supporting wheel and which when in operative position with relation to the ground normally tend to support the frame but have a yieldable connection with the latter so that if the supporting wheel encounters a soft spot or depression relative movement in a substantially vertical direction between the frame and plowing members will immediately occur, whereby the tractional effect of the wheel upon the land will be maintained.

Another of the important purposes of the invention is to provide a plowing implement with a furrow turning member which may be adjusted when standing on unplowed land to work at any one of a plurality of different depths and when in working position will be yieldably supported.

Other ends in view relate to the securing of the foregoing purposes by means which are of most simple, durable and practicable nature.

The foregoing purposes and ends, and other purposes, ends and advantages which will be apparent to those familiar with the present invention and the art to which it relates, are secured from the construction illustrated in the accompanying drawings and set forth in the following description.

In the accompanying drawings, I have exemplified the preferred embodiment but it will be understood that changes in the details may be made without departing from the spirit of the invention or the scope of the claims. In said drawings:—

Fig. 2 is an end elevation thereof;

Fig. 3 is a side elevation of the same;

Fig. 4 is a detail representation of the actuating lever, segment, connecting rod and spring forming part of the means for adjusting the forward furrow turning member, viewed from the side opposite to that shown in Fig. 3: this figure also showing, by the broken lines, a position the parts may assume when the furrow forming member strikes an obstruction;

Fig. 5 is a detail view of the crank which forms a member of the means for adjusting the forward furrow turning member, showing therein the trunnioned bearing for the connecting rod.

Figure 1:
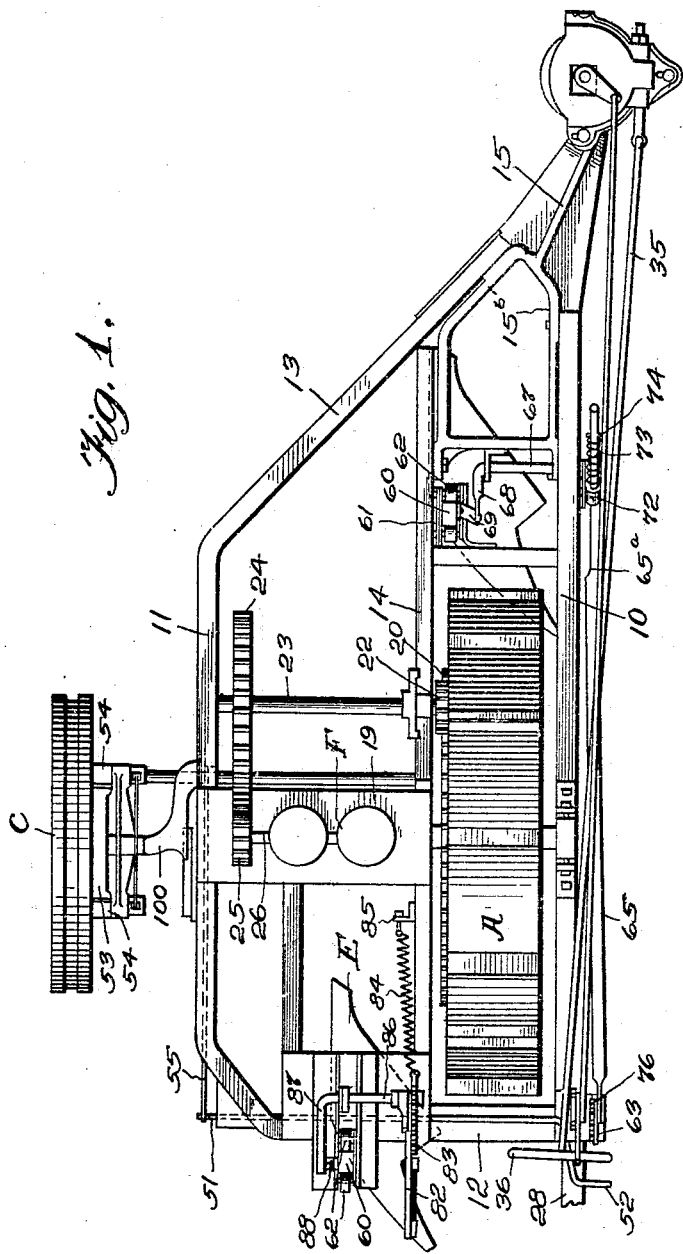
Figure 1 is a plan view of a motor plow embodying the present improvements.

The furrow forming means constituting the main portion of the present invention is illustrated as embodied in a motor plow which has been made the subject of a parent application (Number 48,813) hereinbefore referred to. It may, however, be otherwise employed, and it is not my purpose to restrict the scope of the protection to the use of said means as a part of a plow of any particular style or construction but to use and protect it in connection with, or as a part of, any style or type of plow, whether motor driven or not, with or as a part of which it is capable of being practically employed.

Hence it will be understood that while I have illustrated and shall hereinafter describe the invention in connection with a motor driven plow of somewhat particular construction, this is merely exemplary, and is not to be construed as restricting the invention thereto, except as necessary within the spirit of the respective claims.

The main frame is provided with a straight side member 10 which extends from the front to the rear end of the frame. Its other members may be variously arranged to produce a frame which is wider at the rear than at the front. The frame herein exemplified comprises a longitudinal member 11 arranged at the side opposite the member 10 and extending substantially parallel with the latter for a part of its length and thence extending diagonally toward the front end of the member 10 as shown at 13. The rear ends of the members 10 and 11 are connected with each other by a transverse member 12. 14 designates a third longitudinal member. This is arranged between the members 10 and 11 and substantially parallel with the member 10. Its rear end is suitably secured to the rear transverse member 12. These members preferably are formed of channel irons. The front ends of the members 10, 13 and 14 are secured to a uniting member 15, which extends forwardly and also upwardly therefrom. This member is preferably a strong casting having horizontal flanges $15^a$, upon which the frame members 10, 13 and 14 respectively rest, and vertical webs $15^b$ against which said members respectively lie, suitable means being employed to secure the contacting parts of the members together. The uniting member 15 also supports the guiding and castering means hereinafter particularly referred to, and for this purpose is provided at the front end with a sleeve $15^c$ surmounted by a plate $15^d$.

A designates a large supporting wheel of suitable construction, which is arranged between the members 10 and 14 and at or about the longitudinal center of the implement. Immediately in advance of this wheel A there is a forward furrow turning member B of any suitable kind, the one herein shown being an ordinary single moldboard plow. This forms a furrow on the bottom of which the wheel A runs. At one side of the frame there is arranged a suitable wheel C which travels upon the unplowed land and is suitably mounted to be vertically adjustable in accord with the depth of the furrow in which the wheel A runs, any of the usual or suitable means for such adjustment being employed.

At the front end of the implement there is a guide wheel D. This guide wheel is offset from the line of the forward furrow forming member and wheel A and traverses a furrow, made on the previous travel of the implement by a rear furrow forming member E which is disposed at the rear of the axis of the wheel A and is set in from the line of said wheel and furrow forming member B.

The wheel A, preferably, as herein shown is a large one and receives motion from an engine of suitable type which is geared thereto and is carried by the frame of the implement. The engine is illustrated diagrammatically at F and is shown as being mounted on the bed plate 19 supported by the members 11 and 14. The engine employed is preferably of the gasolene type and in such case, a suitable radiator, clutch, etc., not necessary herein more particularly to set forth, will be provided in practice.

Any suitable means for transmitting the power of the engine to the traction wheel may be employed, one such being herein exemplified. The means herein shown comprises a spur gear 20 which is suitably secured to the wheel A and has its teeth engaged by a pinion 22 mounted on a transverse shaft 23 which carries a gear 24 which meshes with a gear 25 mounted on the engine shaft 26.

The points or cutting edges of the front and back furrow forming members B and E are at the same level, and the lower surfaces of the guide wheel D and wheel A run upon the bottom of the furrows made by said members. As already stated, the wheel A traverses a furrow made in the same travel of the implement by the furrow forming member immediately in front of it, while the guide wheel is arranged in advance but to one side of the line of the front furrow forming member and traverses the furrow made on the previous travel of the implement by the rear furrow forming member, as clearly shown in Fig. 1. A furrow wall is thus presented against which the guide wheel may bear and which may be used as a guide in the manual guidance of the implement. A further important advantage results from the use of furrow forming members and wheels arranged in the lines herein set forth, as forces are thereby brought into operation which overcome an objectionable extent of side draft which would tend to unnecessarily strongly press the guide wheel against the solid wall at one side of the furrow or the loose dirt at the other side of the furrow, such as occurs when furrow forming member or members arranged only at the front or only at the rear of the wheel A, are employed. This unnecessary side draft introduces an unnecessary amount of friction for the motive power to overcome.

Moreover, the employment of furrow forming members arranged as herein shown, reduces the number of travels of the implement required in plowing a field: the setting of the furrow forming member so that its points or cutting edge is level with the bottom of the wheel A produces a furrow with a smooth even bottom by overcoming any tendency for the frame to tilt forward or back, which tendency, unless corrected, would produce an uneven furrow; and these smooth even bottoms provide most desirable bases for the wheel and guide wheel A to traverse. When single moldboard furrow forming members, such as herein exemplified, are employed, they are set out of line with each other a distance equal to the width of the furrow which each is to make, as shown in Fig. 2, thus giving sufficient side draft to hold the inner edge of the guide wheel against the solid wall of the previously formed furrow with strength sufficient for the purpose intended to be secured, but with no undue force, that is, with no force unnecessary in proper plowing. The forward furrow forming member is arranged so that it will plow a strip one side of which is substantially in line with the outer side of the wheel A and the other side of which is in line with the inner side of said wheel, while the rear furrow forming member is arranged to plow a strip commencing substantially in line with the inner side of the wheel A.

The wheel D is connected with means whereby it may be guided by the operator on the seat 27 at the rear of the implement. This seat 27 is mounted on the upper end of a seat carrier 28, and is disposed substantially in line with the straight side member 10. The guide wheel D and the forward furrow forming member B are arranged adjacent to the line of said member 10. Hence, the operator has an unobstructed view of said guide wheel and furrow forming member and is thereby enabled better to guide the implement in a straight path. The wheel D is journaled in the lower end of a yoke 30 which is provided with a vertical pivot 31 mounted in the sleeve 15$^c$ at the front end of the casting 15. The mechanism by which this sleeve is turned by the operator need not be particularly herein described as it forms no part of this invention and is fully set forth in the parent case hereinbefore referred to. It is operated by a rearwardly extending rod 35 whose rear end is provided with suitable means, as a hand wheel 36, within convenient reach of the operator on the seat 27.

When the implement is being guided manually short turns, at the ends of the rows, for example, may be made by releasing the guide wheel D, and locking the land wheel C, the implement then turning as on a pivot around the wheel C as an axis, the power being applied to the traction wheel. It will be observed that the lower end of the yoke 30 is inclined rearward, so that the center of the wheel D is out of line with the pivot 31, to facilitate the castering operation of the wheel. The locking of the land wheel C may be accomplished by any suitable braking means operable from a point within convenient reach of the operator on the seat 27. As the particular means for the purpose is not essential to the invention I do not consider it to be necessary to enter into any detailed explanation, but the mechanism herein described comprises, speaking generally, a transverse shaft 51 suspended in suitable bearings provided on the frame and having a down-turned cranked end 52 near the seat. The wheel C is provided with a drum 53, and suitable brake shoes, shown at 54, are arranged to engage the drum by appropriate movement of the shaft 51, the shaft 51 being connected with the brake shoes by means which includes a rod 55 and suitable connections between the rod and the shoes.

The furrow forming members are independently adjustable relatively to the frame of the implement by mechanisms, having operating members within convenient reach of the operator on the seat 27 and the adjusting means are such that each furrow-forming member may be set to work at different depths and each adjusted to transport position, in a most convenient and easy way. Further, the adjusting means devised by me and shown in the accompanying drawings is of such nature that the furrow-turning members may be set to work at a predetermined depth prior to the commencement of the plowing operation and when in operation will be yieldably supported in order that they may ride over any obstructions and adjust themselves when depressions or soft spots are reached. Mechanisms having the characteristics herein set forth and which, at the same time, are of most simple and practicable construction will now be described.

Each furrow turning member B and E is provided with a vertical standard 60 which is mounted for vertical movement within a suitable guiding frame 61 carried by the frame. Each guiding frame preferably has friction-reducing rollers 62 engaging the forward and rear edges of the standard which passes through the frame. The forward furrow-turning member B is operated by a lever 63 which is pivoted at 64 to an appropriate part of the frame and is arranged adjacent to the seat 27, the lower end of the lever being connected by a rod 65 with a crank 66 projecting from a shaft 67 having a second crank 68 extending rearward therefrom (shown in dotted lines in Fig. 3), the second crank having its rear end connected to a link 69 from the upper end of which a laterally projecting pin 70 extends into any one of a plurality of apertures 71 formed in the standard 60. It will be noted that when the upper end of the lever 63 is pulled backward, the furrow-turning member B being assumed to be in working position, the connecting means between the lever and said member will be moved in a direction which raises the member to transport position. In order that the member may be adjusted to working position, when the implement is standing on unplowed land, the crank 66, as shown best in Fig. 5, has its upper end bifurcated and within this bifurcated portion there is disposed a journaled bearing 72 through which the rod 65 extends loosely. The rod projects forwardly beyond the bearing and its projecting end is encircled by a spring 73, one of whose ends preferably abuts against a stop 74 on the rod and the other of whose ends preferably abuts against the forward surface of the bifurcated portion 66ª of the crank 66. It will be seen that when the implement is standing on unplowed land and the lever 63 is thrust forward the rod 65 will be moved through the bearing 72, thereby placing the spring 73 under tension such that it exerts pressure upon the member B through the crank 66, shaft 67, crank 68, link 69 and standard 60, which pressure aids the force of gravity in the lowering of the furrow turning member to its working position when the plow enters the land. The movement of the rod 65 relatively to the crank 66, permitted by the connection described, enables the lever to be thrust forward to a position beyond that defined by the engagement of the furrow-turning member with the land and hence the furrow-turning member may be set to work at a predetermined depth while the implement is standing upon unplowed land. A shoulder 65ª is provided on the rod to limit movement of the arm 66 under influence of the spring and prevent excessive downward movement of the member B. The lever is fixed in its predetermined position, preferably by a latch 75 (Fig. 4) arranged to engage any one of the teeth of a segment 76, the latch being preferably operated by means of a grip 77 connected with the latch by a link 78. The segment 76, instead of being fixed, is pivoted, preferably on the pivot 64 of the lever 63, and a spring 79 extends from the segment to an appropriate part of the frame, to which it is secured. In practice, it is preferred to connect the forward end of the spring to a bolt 80 adjustably mounted in a projection 81 fixed upon the frame member 10, this connection permitting the tension of the spring 79 to be adjusted. It will thus be seen that when the lever is released by disengaging the latch from the segment, the lever may be moved relatively to the segment, to adjust the height of the forward furrow-turning member relatively to the frame and that when the said furrow-turning member has been adjusted to working position and the lever has been locked to the segment, the furrow-turning member is under the influence of the spring 79 and is enabled thereby to adjust itself automatically to accord with varying conditions which may be encountered in the operation, such as obstructions, depressions or soft places—the segment, the lever, and the means connecting the lever with said member, moving as a unit.

The adjusting mechanism for the rear furrow-turning member E is preferably substantially like that employed for the forward member except that the position of the rear member with relation to its actuating lever, marked 82, is such that the rod 65 is dispensed with. In other words, the segment 83 is pivoted and a spring 84 extends from the segment to an attaching means 85 carried by an appropriate part of the frame; the lever has a latch for locking it in various selected positions to the segment and its lower end is secured directly to a shaft 86, corresponding to the shaft 67, having a crank 87 with a lateral projection 88 extending into any one of several apertures provided in the standard 60 of the rear member E. This standard is vertically adjustable through an appropriate guide frame 61 having rollers 62 arranged to engage its front and rear edges. While this means connecting the rear furrow-turning member with its adjusting lever does not permit a setting of the lever beyond the point defined by the surface of the land, that is to say, while it does not employ any relatively movable connections between the lever 82 and the crank 86, it should be noted that when the rear furrow-turning member is set, as it is normally in ordinary plowing, in line with the bottom of the supporting wheel A, the depth of the furrow made by it is always the same as that made by the front plowing element and hence there would be no particular advantage in providing means, such as are exemplified in connection with the forward furrow-turning element, for permitting a movement of the adjusting mechanism beyond that defined by the land when the implement is standing on unplowed land. In other words, the only adjustments needed for the rear plowing member are adjustments above the plane of the lower surface for working purposes.

Particular attention is called to the fact that the yieldable mountings for the furrow-turning members not only enable said members to yield to obstructions but further enable them to adjust themselves automatically when depressions or soft spots are encountered in such manner that the tractional effect of the supporting wheel A upon the soil is not diminished. In plowing with one furrow-turning member ahead and the other behind the supporting wheel A, any depression or soft spot in the land would cause the weight of one side of the implement to rest on the furrow-turning members and if these members were rigidly supported the tractional effect of the wheel A on the land would be diminished and said wheel would not work properly because of its failure to get a firm grip on the land under it. This is especially true when the invention is embodied in an implement in which power to propel the implement is applied to the wheel A, for in such case the loss of the tractional effect of the wheel upon the land would stop the progress of the implement, as the wheel A would merely spin around and not take hold of the land. But by the use of the springs, the furrow-turning members will yield to the weight imposed on them, thus permitting the wheel A to get a firm grip on the land under the varying conditions referred to. Hence the described correlation of wheel A and furrow turning members is beneficial when embodied in an implement in which the implement is moved by an external power, as a tractor or animals connected thereto, for instance, but is especially advantageous when the power to propel the implement is derived from a motor which is carried by the implement, and is applied directly to said wheel.

It will be understood that the land wheel C is an idle wheel and that it is mounted on a crank shaft 100 having the ordinary, or any suitable means, for adjusting it to accord with the depth of plowing, this wheel running on the unplowed land while the guide wheel, the wheel A and the plowing members run in furrows, as hereinbefore explained.

The furrow-turning members, being independently adjustable, one may be set to working position and the other in transport position, if required for any reason—when the soil is too hard for both to be used, for example.

Having thus described the invention what I believe to be new and desire to secure by Letters Patent is:—

1. In a plowing implement, the combination of a frame, a supporting wheel and furrow forming members respectively arranged forward and rearward of the axis of the supporting wheel, said furrow forming members being connected with the frame and tending to support the same and being yieldable upwardly to cause the tractional effect of the wheel upon the land to be maintained, substantially as described.

2. In a plowing implement, the combination of a frame, supporting means therefor including a wheel arranged at one side of the implement, a plow immediately in front of the wheel and forming a furrow for the same to traverse, a second plow set in from the line of the first plow and arranged aft rearward of the axis of the wheel, said plows being of the moldboard type and tending to support the frame, and means for supporting the plows to yield when weight is imposed thereon to thereby cause the tractional effect of the wheel upon the land to be maintained.

3. In a plowing implement, the combination with a frame, a guiding and supporting wheel arranged at the front end of the frame to run in a furrow formed in the previous travel of the implement, a second furrow wheel set in from the line of the guiding wheel and arranged rearward thereof at one side of the frame, and a land wheel at the other side of the frame, of a furrow forming member immediately in advance of the second furrow wheel to form the furrow therefor, a furrow forming member, arranged rearward of the axis of said second wheel and set in from the line of the first furrow forming member and forming the furrow in which the first mentioned runs in the next travel of the implement, said furrow forming members tending to support the frame and being supported to yield upwardly when the frame is tilted sidewise toward them, to thereby cause the tractional effect of said second wheel to be maintained when a soft spot or depression is encountered.

4. In a plowing implement, a frame, means including a furrow wheel for supporting the same, and a plurality of furrow forming members respectively arranged forward and rearward of the axis of said wheel and each having a yieldable connection with the frame, substantially as described and for the purpose set forth.

5. In a plowing implement, a frame, a furrow-wheel forming a support for the frame, a guiding wheel also arranged to run in a furrow, and a plurality of upwardly yieldable furrow forming members respectively arranged forward and rearward of the axis of the first-mentioned wheel, substantially as described and for the purposes set forth.

6. In combination, a furrow forming member and means for holding the same in different operative positions, said means including an adjusting lever, connections between the lever and the furrow forming member, a pivoted element, the lever being movable relatively to the pivoted element to adjust the furrow forming member, means for locking the lever adjustably to the pivoted element, and a spring arranged to hold the lever, connections and pivoted element under tension which permits the same to yield.

7. In a plowing implement, a wheel-supported frame, a furrow-forming member supported by and movable vertically with respect to the frame, and adjusting means for the furrow-forming member, arranged to hold the latter yieldably in the ground, the adjusting means including a pivoted segment, a lever provided with a latch for locking it adjustably to the segment, an operative connection between the lever and furrow-forming member, and a spring having connection with the segment and, when the lever is locked to the segment, tending to hold the furrow-forming member in the ground and enabling the furrow-forming member, connections, lever and segment to yield.

8. In a plowing implement, a wheel-supported frame, a furrow forming member supported by and movable vertically with respect to the frame, and adjusting means for the furrow-forming member, arranged to hold the latter yieldably in the ground, the adjusting means including a rock shaft, a rock arm on the shaft, an operative connection between the rock arm and furrow-forming member, a second rock arm on the shaft, a pivoted segment, a lever provided with a latch for locking it adjustably to the segment, a connecting rod between the lever and second rock arm, and a spring having connection with the segment and, when the lever is locked to the segment, tending to hold the furrow forming member, lever and segment yieldably.

9. In a plowing implement, a wheel-supported frame, a furrow-forming member supported from the frame and adjustable vertically with respect to the frame, adjusting means for the furrow-forming member arranged to permit the member to be set while on unplowed ground, including a lever, and an operative connection between the member and lever, the connection including an arm, a rod slidable through the arm, and means to hold the rod and arm yieldably against relative movement.

10. In a plowing implement, a wheel-supported frame, a furrow-forming member supported from the frame for vertical movement relative thereto, and means arranged to permit the member to be set while on unplowed ground, including a rock shaft having operative connection with the member, a rock arm on the shaft, a rod having one end slidable through the rock arm and provided with means to limit movement in one direction, yieldable means on the rod to permit resisted sliding movement in the other direction, and means to move the rod and thereby operate the rock shaft.

11. In a plowing implement, a wheel supported frame, a furrow-forming member supported from the frame and adjustable vertically with respect to the frame, adjusting means for the furrow-forming member, comprising a rock shaft having operative connection with the member, a rock arm on the shaft, having a fork at its end, a bearing trunnioned in the fork, a rod slidable through the bearing and a spring mounted on the rod and having one end resting against the bearing.

12. In a plowing implement, the combination of a frame, supporting means therefor including a furrow wheel at one side of the implement, a plurality of furrow forming members respectively arranged forward and rearward of the axis of said wheel, said members tending to support the frame, and means for setting them respectively in different operative positions and holding them yieldably in their different selected positions while they are at work, for the purposes set forth.

13. In a plowing implement, the combination of a frame, supporting means therefor including a furrow wheel at one side of the implement, a plurality of furrow forming members respectively arranged forward and rearward of the axis of said wheel, and an adjusting and supporting means between each furrow forming member and the frame, each of said means including a pivoted adjusting lever having connection with the corresponding furrow forming member, a spring, a pivotally mounted connection between the spring and the lever, and elements for locking the lever to said connection for unitary movement under the influence of the spring, said elements being releasable from each other to permit the lever to be moved relatively to the pivotal connection to effect adjustment of the furrow forming member.

14. In a plowing implement, the combination of a frame, supporting means therefor including a furrow wheel at one side of the implement, a plurality of furrow forming members respectively arranged forward and rearward of the axis of said wheel, and an adjusting and supporting means between each furrow forming member and the frame, each of said means including an adjusting lever, means connecting the lever with the corresponding furrow forming member, a toothed segment, a latch for locking the lever releasably to the segment, said segment and lever being pivotally connected to the frame, and a spring having one end connected with the segment and its other end connected with the frame.

In testimony whereof I affix my signature.

CHARLES T. RAY.

Copies of this patent may be obtained for five cents each, by addressing the "Commissioner of Patents, Washington, D. C."